United States Patent [19]

Burr

[11] Patent Number: 5,538,355

[45] Date of Patent: Jul. 23, 1996

[54] KEY APPARATUS

[75] Inventor: Stephen M. Burr, Morton, Ill.

[73] Assignee: Caterpillar Inc., Peoria, Ill.

[21] Appl. No.: 295,586

[22] Filed: Aug. 25, 1994

[51] Int. Cl.⁶ .................................................. F16B 3/00
[52] U.S. Cl. .......................... 403/356; 403/355; 403/404
[58] Field of Search ........................... 403/318, 319–375, 403/376, 315, 404; 74/439, 448, 451, 446

[56] References Cited

U.S. PATENT DOCUMENTS

| | | |
|---|---|---|
| 110,510 | 12/1870 | Stedman . |
| 313,711 | 3/1885 | Corser . |
| 423,701 | 3/1990 | Roemmele . |
| 1,460,222 | 6/1923 | Benjamin . |
| 1,560,399 | 11/1925 | Preston, Sr. .......................... 403/355 X |
| 1,937,502 | 12/1933 | Anger ......................................... 287/52 |
| 2,681,239 | 6/1954 | Gillen ................................... 287/52.05 |
| 2,894,772 | 7/1959 | Hitt ....................................... 287/52.05 |
| 3,436,106 | 4/1969 | Luenberger ............................. 403/356 |
| 3,487,903 | 1/1970 | Stickan ..................................... 192/107 |
| 4,171,939 | 10/1979 | Harwath ................................... 418/170 |
| 4,217,061 | 8/1980 | Eiland et al. ............................ 403/313 |
| 4,711,605 | 12/1987 | Hodlewsky ............................. 403/355 |
| 5,119,995 | 6/1992 | Kohler et al. ........................ 403/356 X |
| 5,181,432 | 1/1993 | Allen ......................................... 74/395 |

FOREIGN PATENT DOCUMENTS

| | | | |
|---|---|---|---|
| 357967 | 11/1905 | France | .................................. 403/358 |

*Primary Examiner*—Brian K. Green
*Assistant Examiner*—Harry C. Kim
*Attorney, Agent, or Firm*—Pankaj Khosla

[57] ABSTRACT

In a key apparatus having a drive keyway, the drive keyway comprises, a first side wall having a planar inner surface, a second side wall having a planar inner surface, and an end wall having a curvilinear "wave-shaped" inner surface. The first and second side walls are spaced apart, and connected to and extend generally transverse the end wall. The configuration of the drive keyway is very helpful in reducing stress concentration in the gear, and minimizing any motion of the drive key in the axial direction. The present invention is particularly useful in making powdered metal gears for gear pumps, such as hydraulic gear pumps.

8 Claims, 1 Drawing Sheet

Fig_1_
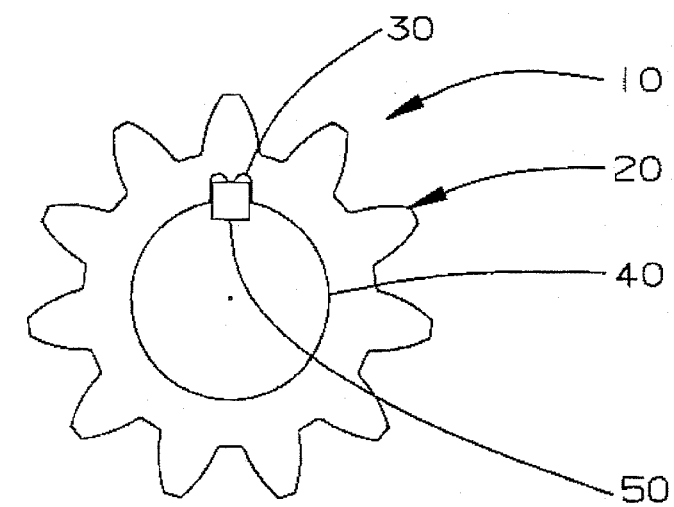
Fig_2_
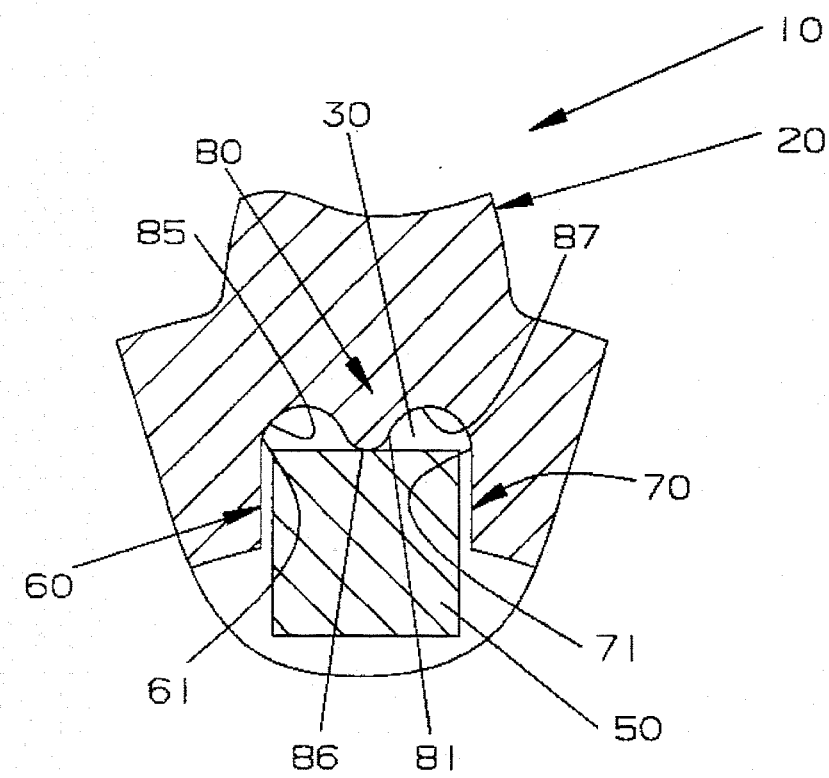

KEY APPARATUS

TECHNICAL FIELD

The present invention relates to a key apparatus and more particularly, to a drive keyway in a powdered metal gear of a hydraulic gear pump.

BACKGROUND ART

Powdered metal gears are frequently used in pumps, such as gear pumps for example, as a lower cost alternative to machined steel gears. Generally, powdered metal gears perform very reliably in hydraulic gear pumps. Whenever powdered metal gears fail, it has been observed that the failures can be attributed to two potential causes. The first cause is generally, an improper heat-treatment during the manufacturing process, which results in brittleness of the powdered metal. The second cause of failure of a powdered metal gear is related to the design of the drive keyway for the connection of the drive gear to its shaft. This invention is directed at eliminating this second cause, and relates to an improved drive keyway in a powdered metal gear.

Typically, the drive keyways have inner side walls and end walls having planar surfaces which meet in sharp corners. The drive keyway is typically adapted to receive a key which is received partially in the drive keyway in the gear and the drive keyway in the machined metal shaft. It has been observed that a "sharp-cornered" keyway in a powdered metal gear is a major contributor of failures in the gear due to stress concentration in the sharp corners.

It is desirable to have a powdered metal gear that does not fail due to cracking that originates from stress concentration in the drive keyway. It is thus desirable to have a gear having a drive keyway that is not subjected to stress concentration in any localized area. It is further desirable that this drive keyway have a configuration that not only reduces stress concentration, but also minimizes any motion of the drive key in the axial direction. The present invention is directed to overcome one or more of the problems as set forth above.

DISCLOSURE OF THE INVENTION

In one aspect of the invention, in a key apparatus having a drive keyway extending axially therethrough, the drive keyway comprises, a first side wall having a planar inner surface, a second side wall having a planar inner surface, and an end wall having a curvilinear inner surface. The curvilinear inner surface includes a first portion, a second portion and a third portion. The first, second and third portions have a semicircular configuration. The first and third portions are generally concave, and the second portion is generally convex and blends with the first and third portions to form a curvilinear "wave-shaped" surface. The first and second side walls are spaced apart, and connected to and extend generally transverse the end wall.

The configuration of the drive keyway is very helpful in reducing stress concentration in the gear, and minimizing any motion of the drive key in the axial direction. The present invention is particularly useful in making powdered metal gears for gear pumps, such as hydraulic gear pumps.

BRIEF DESCRIPTION OF THE DRAWINGS

FIG. 1 is a front elevational view of a gear embodying the present invention; and FIG. 2 is an enlarged view of a portion of FIG. 1, representing the preferred embodiment of the present invention.

BEST MODE FOR CARRYING OUT THE INVENTION

Referring to FIG. 1 of the drawing, a gear having a drive keyway, generally designated 10 illustratively comprises a plurality of gear teeth, generally designated 20, and a drive keyway 30, extending axially through the gear. A drive shaft 40 extends through gear 10 and is rotatingly connected to gear 10 by a drive key 50, which is received in the drive keyway 30.

Referring to FIG. 2, which shows a preferred embodiment of the present invention, in a gear 10 having gear teeth 20, and a drive keyway 30, the drive keyway comprises, a first side wall 60 having a planar inner surface 61, a second side wall 70 having a planar inner surface 71, and an end wall 80 having a curvilinear inner surface 81.

The inner surface 81 includes a first portion 85, a second portion 86, and a third portion 87. Portions 85, 86, 87 each are of a semicircular configuration. First and third portions 85, 87 are generally concave while second portion 86 is generally convex. First portion 85 blends with second portion 86, and second portion 86 blends with third portion 87, to form a curvilinear "wave-shaped" surface with rounded corners.

The first and third portions 85, 87 reduce the stress concentration at the corners of the drive keyway. The second portion 86 is adapted to contact and locate a drive key 50 and limit its motion in the axial direction, when the drive key is received in the drive keyway 30.

The first and second side walls 60,70 are spaced apart, connected to and extend generally transverse the end wall 80. The first and second side walls 60,70 are preferably parallel to one another.

In the preferred embodiment of the present invention, the ratio of the radius of the first portion 85 to the radius of the third portion 87 is desirably in the range of about 0.1:1 to about 2:1, and preferably, about 1:1. If this ratio is less than 0.1:1 or greater than 2:1, there is unequal stress reduction at the rounded corners of the drive keyway.

In the preferred embodiment of the present invention, the ratio of the radius of the second portion 86 to the radius of each of the first portion 85 and the third portion 87, is desirably in the range of about 0.1:1 to 2:1, and preferably, about 0.33. If this ratio is less than 0.1:1, the second portion will be too sharp edged and will wear rapidly due to continuous contact with the drive key surface. As the second portion wears, its ability to limit the axial motion of the drive key will be reduced. If this ratio is greater than 2:1, there may be a reduction in the stress relaxation at the corners.

In the preferred embodiment of the present invention, the gear is made from a powdered metal, by sintering, or other suitable means.

Industrial Applicability

A gear having a drive keyway according to the present invention is particularly useful in gear pumps, and specifically in hydraulic gear pumps. In comparison, pumps having powdered metal gears with a drive keyway having a "wave-shaped" end wall, according to the present invention, perform well at pressures averaging about 16.5% greater than pumps having powdered metal gears with a drive keyway having a "sharp-cornered" end wall. Other aspects, objects and advantages of this invention can be obtained from a study of the drawing, the disclosure and the appended claims.

I claim:

1. A key apparatus having a drive keyway extending axially therethrough, said drive keyway comprising:

a first side wall having a planar inner surface;

a second side wall having a planar inner surface;

an end wall having a curvilinear inner surface, said curvilinear inner surface having a first, second, and third portions, said first, second, and third portions each being of a semicircular configuration, said first and third portions being generally concave, and said second portion being generally convex and blending with said first and third portions to form a curvilinear wave-shaped surface; and said first and second side walls being spaced apart, and connected to and extending generally transverse to said end wall.

2. The key apparatus, as set forth in claim 1, wherein said first and second side walls are spaced apart and generally parallel to each other.

3. The key apparatus, as set forth in claim 1, wherein said first and third portions each have a respective radius, and a ratio of the radius of said first portion to the radius of said third portion is in a range of about 0.70:1.0 to about 1.40:1.0.

4. The key apparatus, as set forth in claim 3, wherein the ratio of the radius of said first portion to the radius of said third portion is about 1:1.

5. The key apparatus, as set forth in claim 1, wherein said first, second and third portions each have a respective radius, and a ratio of the radius of said second portion to the radius of said first portion is in a range of about 0.14:1.0 to 0.60:1.0 and a ratio of the radius of said second portion to the radius of said third portion is in a range of about 0.14:1.0 to 0.60:1.0.

6. The key apparatus, as set forth in claim 5, wherein the ratio of the radius of said second portion to the radius of said first portion is about 0.33:1.0 and the ratio of the radius of said second portion to the radius of said third portion is about 0.33:1.0.

7. The key apparatus, as set forth in claim 1, wherein said second portion is adapted to contact and locate a drive key, when said drive key is received in said drive keyway.

8. The key apparatus, as set forth in claim 1, wherein said key apparatus is made from a powdered metal.

* * * * *